(12) United States Patent  
Sugiyama et al.

(10) Patent No.: US 8,830,542 B2
(45) Date of Patent: Sep. 9, 2014

(54) ILLUMINATION APPARATUS AND IMAGE READING APPARATUS

(71) Applicant: Canon Kabushiki Kaisha, Tokyo (JP)

(72) Inventors: Takayuki Sugiyama, Utsunomiya (JP); Narumasa Ito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/083,575

(22) Filed: Nov. 19, 2013

(65) Prior Publication Data

US 2014/0139893 A1 May 22, 2014

(30) Foreign Application Priority Data

Nov. 21, 2012 (JP) ................................ 2012-255273
Nov. 8, 2013 (JP) ................................ 2013-232394

(51) Int. Cl.
H04N 1/04 (2006.01)
F21V 8/00 (2006.01)
H04N 1/024 (2006.01)

(52) U.S. Cl.
CPC .............. *H04N 1/024* (2013.01); *G02B 6/0096* (2013.01)
USPC ............. 358/475; 358/484; 358/483; 358/482

(58) Field of Classification Search
USPC ............................ 358/475, 484, 483, 482, 509
See application file for complete search history.

(56) References Cited

U.S. PATENT DOCUMENTS

| | | | |
|---|---|---|---|
| 8,218,205 B2 * | 7/2012 | Nagatani et al. | ............... 358/475 |
| 8,379,275 B2 * | 2/2013 | Tahk et al. | ..................... 358/475 |
| 2009/0303732 A1 | 12/2009 | Ikeda | |
| 2011/0149590 A1 | 6/2011 | Kamei et al. | |

FOREIGN PATENT DOCUMENTS

| | | |
|---|---|---|
| JP | 11-55464 A | 2/1999 |
| JP | 2000-125080 A | 4/2000 |
| JP | 2002-051189 A | 2/2002 |
| JP | 2002-064676 A | 2/2002 |
| JP | 2002-125098 A | 4/2002 |
| JP | 2005-005244 A | 1/2005 |
| JP | 2006-014081 A | 1/2006 |
| JP | 2006-042016 A | 2/2006 |
| JP | 2006-054635 A | 2/2006 |
| JP | 2008-010300 A | 1/2008 |
| JP | 2009-022007 A | 1/2009 |
| JP | 2009-038634 A | 2/2009 |

(Continued)

*Primary Examiner* — Houshang Safaipour
(74) *Attorney, Agent, or Firm* — Rossi, Kimms & McDowell LLP

(57) ABSTRACT

An illumination apparatus for use in an image reading apparatus that forms a reduction image of a read area of an original on an image pickup element by an imaging optical system, includes: a light source illuminating the original; and a light guide guiding light to the original; wherein the light guide has a first surface on which light is incident or that diffuses light, a second surface from which light exits toward the read area, and a third and fourth surfaces arranged between the first and second surfaces in a sub-scanning section perpendicular to a longitudinal direction of the light guide, the third surface arranged on a side closer to an optical axis of the imaging optical system, and the fourth surface arranged on a side farther from the optical axis, wherein the third and fourth surfaces are reflective surfaces having the same paraxial power which is appropriately set.

19 Claims, 7 Drawing Sheets

(56) References Cited

FOREIGN PATENT DOCUMENTS

| JP | 2009-302646 A | 12/2009 |
| JP | 2011-086987 A | 4/2011 |
| JP | 2012-070411 A | 4/2012 |
| JP | 2012-124836 A | 6/2012 |
| JP | 2012-142738 A | 7/2012 |

* cited by examiner

ILLUMINATION APPARATUS AND IMAGE READING APPARATUS

BACKGROUND OF THE INVENTION

1. Field of the Invention

The present invention relates to an illumination apparatus and an image reading apparatus suitably applicable particularly to an image scanner, a copying machine, a facsimile machine, or the like that performs image reading by a line sequential method while illuminating the original surface with light.

2. Description of the Related Art

Illumination apparatuses (original illumination apparatuses) using an LED (light emitting diode) or EL (electro luminescence) light source have been known. Such apparatuses have, for example, an array-disposition type construction in which a plurality of LED or EL light sources are arranged along the main scanning direction of the original surface or an edge-disposition type construction in which an LED or EL light source is disposed at an end of a light guide made of a translucent resin or the like with respect to the main scanning direction so that light beams emitted from the light source propagate through the light guide. Nowadays, with increases in the light emission efficiency of LED and EL light sources, the edge-disposition type arrangement, which allows a reduction in the number of LEDs or a reduction in the EL light emission area, is receiving attention.

Some originals read by an image reading apparatus are placed on the original platen glass with a portion thereof, such as the binding portion of a book, floating. It is necessary to illuminate such a floating portion without a significant difference in the light intensity from that in a case where the original surface is placed on the original platen glass. To meet such need, methods of improving illumination depth characteristics (light intensity variation with floating of the original) have been developed.

U.S. Patent Application Publication No. 2009/0303732 discloses a technique in which a deflection means is provided in the exit portion of the light guide in the edge-disposition type arrangement to shift the light intensity distribution of the emitted light along the sub-scanning direction, thereby improving illumination depth characteristics. Specifically, the exit portion has first flat surface that causes emitted light to illuminate a normal original surface position and a second flat surface that is inclined relative to the first flat surface and causes emitted light to illuminate the position of a floating portion. U.S. Patent Application Publication. No. 2011/0149590 discloses a technique in which a diffusive, reflective member is provided along the main scanning direction outside the lower region of the light guide in the edge-disposition type arrangement with an air layer therebetween to enhance the diffusing effect, thereby improving illumination depth characteristics.

However, with increasing needs for improved image quality and increased processing speed in the image reading apparatus, further improvement meeting such needs is required nowadays. The apparatus disclosed in U.S. Patent Application Publication No. 2009/0303732 cannot have an illumination area with stable light intensity that is sufficiently large along the sub-scanning direction to achieve high image quality. Specifically, to achieve high-quality image reading, a reading system using a reduction optical system having a long optical path length and a large depth of field is typically adopted. This system needs a countermeasure against a large variation in the reading position caused by a small difference in the mounting position and the mounting angle of a mirror and an imaging optical system arranged in the optical path.

On the other hand, the apparatus disclosed in U.S. Patent Application Publication No. 2009/0303732 uses a CIS (contact image sensor) that reads images with a unity (or one-to-one) magnification imaging system having a short optical path length. Therefore, large variations in the reading position with respect to the sub-scanning direction are not taken into consideration.

Although U.S. Patent Application Publication No. 2011/0149590 provides improvement in the illumination depth by ensuring an illumination area with stable light intensity that is sufficiently large along the sub-scanning direction by virtue of a diffusive member for enhancing the diffusing effect, no consideration is given to improvement in the processing speed. In other words, in the apparatus disclosed in U.S. Patent Application Publication No. 2011/0149590, a decrease in the light intensity occurs due to the diffusing effect, leading to insufficient light intensity on the original surface.

SUMMARY OF THE INVENTION

An object of the present invention is to provide an illumination apparatus and an image reading apparatus having an illumination area with stable light intensity that is sufficiently large along the sub-scanning direction, an enhanced condensing efficiency with respect to the sub-scanning direction, and an increased illumination depth, while using a reduction optical system.

According to one aspect of the present invention, an illumination apparatus for use in an image reading apparatus that forms a reduction image of a read area of an original on an image pickup element by an imaging optical system, includes: a light source illuminating the original; and a light guide guiding light from the light source to the original; wherein the light guide has a first optical surface on which light from the light source is incident or that diffuses light from the light source, a second optical surface from which light exits toward the read area, a third optical surface, and a fourth optical surface, the third optical surface and the fourth optical surface being arranged between the first optical surface and the second optical surface in a sub-scanning section perpendicular to a longitudinal direction of the light guide, the third optical surface being arranged on a side closer to a reading optical axis of the imaging optical system, and the fourth optical surface being arranged on a side farther from the reading optical axis of the imaging optical system, wherein the third optical surface and the fourth optical surface are reflective surfaces having paraxial powers equal to each other, wherein the following condition is satisfied, $1.5 \leq \phi \leq 2.8$, where $\phi$ is the paraxial power of the third optical surface and the fourth optical surface.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Image Reading Apparatus

Figure 1A:
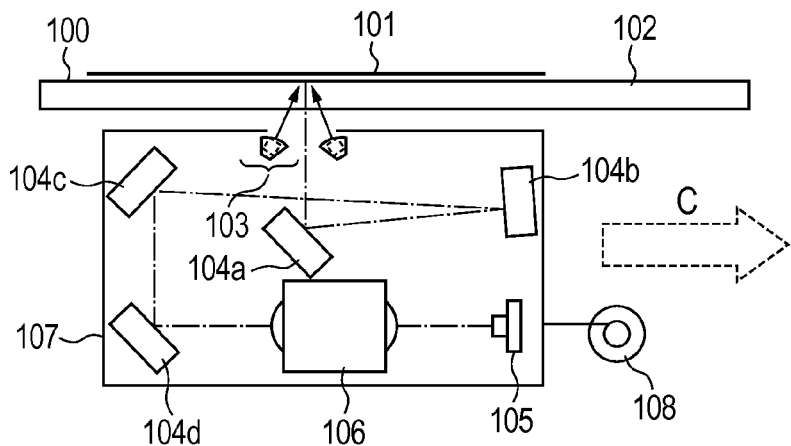
FIG. 1A is a schematic diagram showing the basic construction of the relevant portion of an image reading apparatus equipped with an illumination apparatus according to an embodiment of the present invention.

FIG. 1A is a schematic diagram showing the basic construction of the relevant portion of an image reading apparatus 100 equipped with an illumination apparatus according to an embodiment of the present invention. An integrated scanning optical system unit (which is sometimes referred to also as a "carriage unit") 107 moving in an integrated manner in the direction of arrow C includes an illumination apparatus 103 for illuminating an original 101 placed on an original platen glass (platen) 102.

The integrated scanning optical system unit 107 also includes a reading unit (line sensor or image sensor) 105, which serves as an image pickup element that reads beams coming from the illuminated original 101. The integrated scanning optical system unit 107 further includes a plurality of turn back mirrors 104a to 104d that guide light beams coming from the original 101 to the reading unit 105 and an imaging optical system (imaging lens) 106 that converges light beams containing image information coming from the original 101 onto a surface of the reading unit 105 as the image plane. The imaging optical system 106 in this embodiment is a reduction optical system that forms a reduction image of the read area of the original 101 on the surface of the reading unit 105.

The integrated scanning optical system unit 107 having the above-described construction is moved for scanning in the direction indicated by arrow C in FIG. 1A by a drive motor (subscanning motor) 108 as a drive unit. The components constituting the integrated scanning optical system unit 107 move for scanning of the original without changing their relative positional relationship.

As shown in FIG. 1A, the turn back mirrors include a first turn back mirror 104a, a second turn back mirror 104b, a third turn back mirror 104c, and a fourth turn back mirror 104d. These turn back mirrors are arranged in such a way that light beams from the original 101 travel from the first turn back mirror 104a to the second turn back mirror 104b, then from the second turn back mirror 104b to the third turn back mirror 104c, and then from the third turn back mirror 104c to the fourth turn back mirror 104d. The light beams incident on and reflected by the fourth turn back mirror 104d are focused by the imaging optical system 106 onto the surface of the reading unit 105.

With the above-described system, image information of the original read by the reading unit 105 is transmitted as an electrical signal to a specific image processing unit (not shown). The electrical signal undergoes a specific signal processing in the image processing unit and is thereafter output from the image processing unit. The image reading apparatus 100 is also provided with power source (not shown) enabling the apparatus to operate.

Illumination Apparatus for Image Reading

Figure 1B:
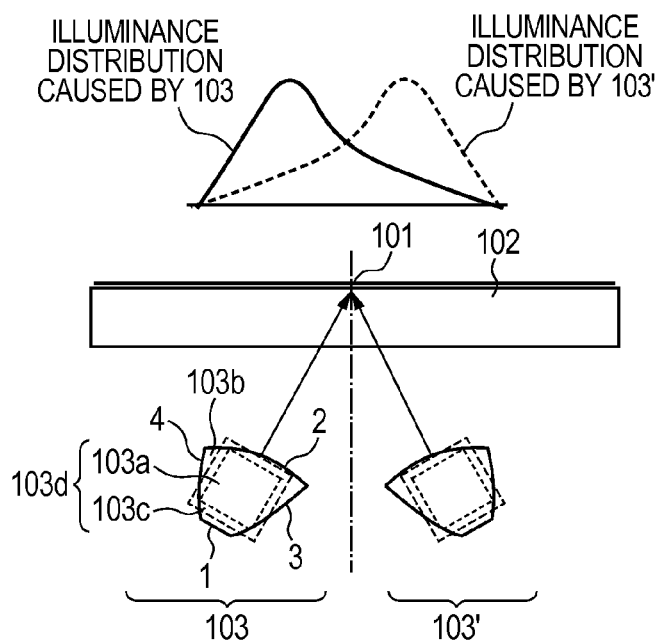
FIG. 1B is a diagram illustrating an illuminance distribution in a read area of an original illuminated by illumination apparatuses according to an embodiment of the present invention from both sides of a reading optical axis.

In the following, an illumination apparatus for image reading (which will be hereinafter referred to as the illumination apparatus) 103 according to the embodiment will be described in more detail. FIG. 1B is a cross sectional view on a sub-scanning section of the illumination apparatus 103 according to this embodiment. The illumination apparatus 103 includes a light source 103a composed of at least one high output power white light emitting element (such as a power LED or high-intensity EL light source), a light guide 103b, and a substrate 103c. There are two identical illumination apparatuses, which are arranged symmetrically on one and the other sides of an original reading optical axis.

As shown in FIG. 1B, the light guide 103b of one of the illumination apparatuses 103 and 103' arranged on both sides of the reading optical axis of the imaging optical system generates an illuminance distribution having a peak of light intensity at a position shifted from the read area of the original toward the light guide 103b. This illuminance distribution and the illuminance distribution of the light guide of the other illumination apparatus, which is symmetrical to the above-described illuminance distribution, are superimposed together to form an illuminance distribution that is uniform along the sub-scanning direction in the neighborhood of the read area of the original (or read position).

In this embodiment, the light source 103a is arranged along the longitudinal direction of the light guide 103b (main scanning direction) in such a way as to be opposed to an incidence surface the light guide 103b on its bottom. Alternatively, the light source 103a is arranged to be opposed to an incidence surface of the light guide 103b on its end with respect to its longitudinal direction (which is the main scanning direction). In the following, the latter case will be described. Thus, the light source 103a is disposed on the substrate 103c to constitute a light source unit 103d, which is provided on one end of the light guide 103b with respect to its longitudinal direction (which is the main scanning direction).

Light Guide

Figure 2:
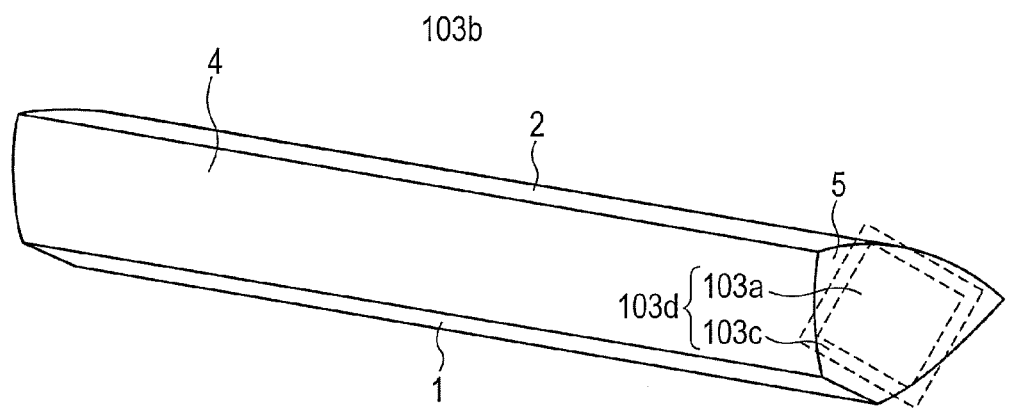
FIG. 2 is a perspective view of a light guide of an illumination apparatus according to a first embodiment of the present invention.

As shown FIG. 2, the light guide 103b has a shape that is uniform along the longitudinal direction, which is the main scanning direction. The light guide 103b used in this embodiment is made of an optical synthetic resin such as plastic. As shown in FIG. 1B, the light guide 103b has a first optical surface 1 that diffuses light beams emitted from the light source unit 103d and entering the light guide 103b through its end surface 5 with respect to the longitudinal direction, in the plane of the drawing sheet (i.e. the section perpendicular to the longitudinal direction or main scanning direction).

The light guide 103b also has a light exit surface 2 as a second optical surface, through which light beams guided toward the read area of the original 101 exit, and a first reflective side surface 3 as a third optical surface, which is arranged between the first optical surface 1 and the light exit surface 2 on the side closer to the reading optical axis. The light guide 103b further has a second reflective side surface 4 as a fourth optical surface, which is farther from the reading optical axis. The light guide 103b has the above-described four optical surfaces. The first reflective side surface 3 and the second reflective side surface 4 may be arranged between the first optical surface 1 and the light exit surface 2 with gaps therebetween. In this illustrative embodiment, they are joined without gaps.

Figure 1C:
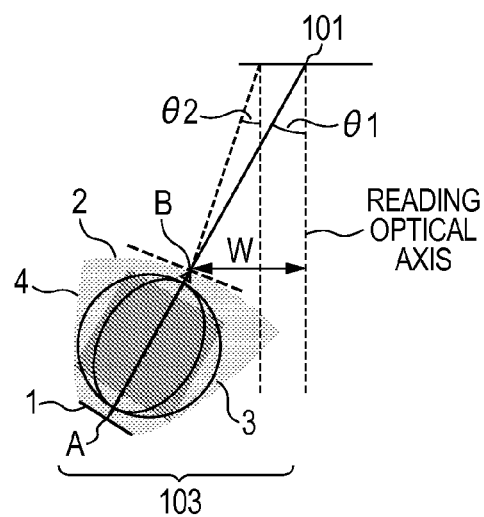
FIG. 1C is a diagram illustrating the construction of a light guide according to an embodiment of the present invention that generates an illuminance distribution having a peak at a position on the light guide side of the reading optical axis.

As illustrated in FIGS. 1C and 2, in this embodiment, the light beams entering through the end surface 5 are partly diffused by the first optical surface 1 and directed directly toward the light exit surface 2 or reflected by the first reflective side surface 3 or the second reflective-side surface 4 to be deflected toward the light exit surface 2. The width of the first optical surface 1 (on the plane of the drawing sheet of FIG. 1C) is 2.4 millimeters.

The first reflective side surface 3 and the second reflective side surface 4 are curved surfaces having a condensing effect. In this embodiment, they are parabolic or ellipsoidal surfaces having a convex power. Specifically, the first reflective side surface 3 and the second reflective side surface 4 are parabolic or ellipsoidal reflective surfaces that have a focal point of the parabolic or ellipsoidal surfaces located at the center A of the first optical surface 1 in cross section perpendicular to the main scanning direction (or in the plane of the drawing sheet of FIG. 1C).

With this arrangement, light beams traveling from the first optical surface 1 to the first reflective side surface 3 or the second reflective side surface 4 can be deflected efficiently toward the read area of the original surface 101 (or the read position). Moreover, this arrangement ensures a sufficient light intensity in the read area of the original surface 101 (or the read position) and a stable illumination area along the sub-scanning direction.

Reflective Surface Sizes of First Reflective Side Surface 3 and Second Reflective Side Surface 4

As illustrated in FIG. 1C, in this embodiment, the first reflective side surface 3 extends to come closer to the read area of the original (or the read position) than the second reflective side surface 4 with respect to the direction toward the read area of the original (or the read position). In other words, the reflective surface size of the first reflective side surface 3 is larger than that of the second reflective side surface 4. In other words, the surface area of the first reflective side surface 3 located closer to the reading optical axis is larger than the surface area of the second reflective side surface 4 on assumption that their cross sectional shapes are uniform along the main scanning direction.

If the surface area of the first reflective side surface 3 and the surface area of the second reflective side surface 4 were the same, light beams traveling from the first optical surface 1 directly toward the light exit surface 2 and exiting through a portion of the light exit surface 2 particularly near the reading optical axis would illuminate an area outside the desired illumination area on the original surface 101 (on the side away from the reading optical axis). The above-described arrangement is adopted with a view to make effective use of such light beams. Specifically, light beams that would otherwise traveling directly through the light exit surface 2 without being reflected by the reflective surface toward the read area of the original are changed into light beams reflected by the first reflective side surface 3. This increases light beams incident on the read area from the region near the reading optical axis, making the variation in the light intensity smaller even in the event of floating of the original or making the illumination depth larger.

To make efficient use of the first reflective side surface 3, the first reflective side surface 3 and the second reflective side surface 4 are designed in such a way as to satisfy the following condition (1):

$$1.1 < S1/S2 < 1.6 \qquad (1),$$

where S1 is the surface area of the first reflective side surface 3, and S2 is the surface area of the second reflective side surface 4.

In this embodiment, the value of S1/S2 is equal to 1.27, which satisfies condition (1). If the value of S1/S2 falls short of the lower limit value of condition (1), the effect will be small. If the value of S1/S2 is larger than the lower limit value of condition (1), the illumination apparatus can be small in size, efficiently change light beams into reflected light beams, and make the illumination depth large while providing a sufficiently large illumination area along the sub-scanning direction. If the value of S1/S2 exceeds the upper limit value of condition (1), the size of the first reflective side surface 3 will become unduly large, leading to an increase in the size of the illumination apparatus. Moreover, the intensity of the light beams coming from the first reflective side surface 3 will become unduly high, making the light intensity large only in the vicinity of the read position. Then, a stable illumination area with respect to the sub-scanning direction which is required in the reduction optical system cannot be provided.

Furthermore, the following condition (2) is satisfied:

$$1.5 \leq \phi \leq 2.8 \qquad (2),$$

where $\phi$ in $mm^{-1}$ is the paraxial power of the first reflective side surface 3 and the second reflective side surface 4.

In this embodiment, in the case where the first reflective site surface 3 and the second reflective side surface 4 are parabolic surfaces, the paraxial curvature radius R is 1.2 millimeters, and the value of $\phi$ is equal to 1.66, which satisfies condition (2).

Condition (2) is a formula limiting the power of the first reflective side surface 3 and the second reflective side surface 4 of the light guide 103b and is to sufficiently secure the illumination area with respect to the sub-scanning direction and the light intensity which are required in a the reduction optical system. If the lower condition of the condition (2) is not satisfied, the condensing action by the reflective side surface reduces, so that the condensing efficiency is not good. In other words, the illuminance distribution in the sub-scanning direction covers the illumination area because of its broad illumination. However, when adopting a reduction optical system which is the case the present invention addresses, a sufficient light intensity cannot be obtained. In addition, as to the shape, the first reflective side surface 3 and the second reflective side surface 4 are more apart from each other, so that the light guide 103b enlarges and the apparatus becomes large, which is a problem.

Further, if the upper condition of the condition (2) is not satisfied, the condensing action of the reflective side surface becomes too large, so that the sufficient light intensity can be secured since the illuminance distribution is configured to illuminate sharply whereas the illumination area in the sub-scanning direction which is required in the case where the reduction optical system is adopted cannot be obtained. In other words, if the upper condition is not satisfied, such condition is not acceptable for a case where the illumination apparatus is used in the reduction optical system but is acceptable for to case in which the illumination apparatus is used in a reading area of CIS type in which the reading position is not deviated.

Light Exit Surface of Light Guide

Due to the difference in the surface area between the first reflective side surface 3 and the second reflective side surface 4, the light exit surface 2 is inclined or deviated relative to the first optical surface 1 in a direction in which the light exit surface 2 becomes more parallel to the original surface 101 in the cross section perpendicular to the main scanning direction (namely, in the plane of the drawing sheet of FIG. 1B) (see FIG. 1C). More specifically, while the first optical surface 1 has a normal line directed to the read area of the original, the light exit surface (the second optical surface) 2 has a normal line directed to a position displaced from the read area of the original.

In consequence, there is generated coma in the sense of lens effect, whereby the barycenter of the light beams incident on the original 101 after traveling directly through the exit surface is displaced to an outer position in the direction opposite to the read position (or away from the read position) from the position of the barycenter of the light beams in the case where the light exit surface is not deviated (FIG. 1B). This effect enables reduction of the variation in the light intensity of direct light coming directly from the first optical surface 1. Such light beams are superimposed with reflected light beams coming from the first reflective side surface 3 and the second reflective side surface 4 to enable an expansion of the depth of illumination.

The light exit surface 2 is a curved surface having a positive power, which condenses reflection light beams coming from the first reflective side surface 3 and the second reflective side surface 4 onto the original surface 101. In this embodiment, specifically, the light exit surface 2 is a curved surface having a curvature radius r of 8.0 millimeters and inclined relative to the first optical surface 1 by 10 degrees.

Illuminance Distribution Along Sub-Scanning Direction and Illumination Depth

Figure 3:
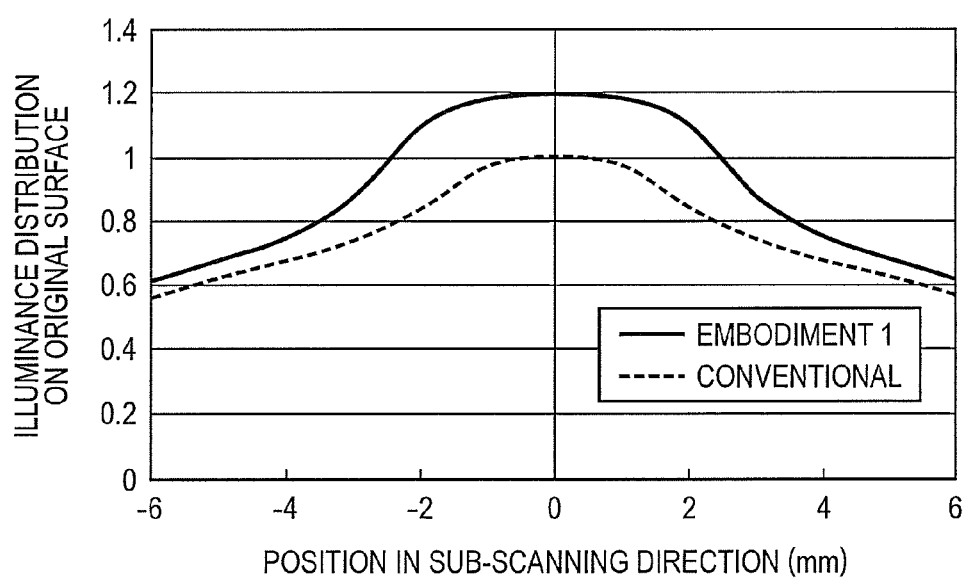
FIG. 3 is a graph showing comparison of the light intensity on the original surface between the illumination apparatus according to the first embodiment and a conventional illumination apparatus.
Figure 4:
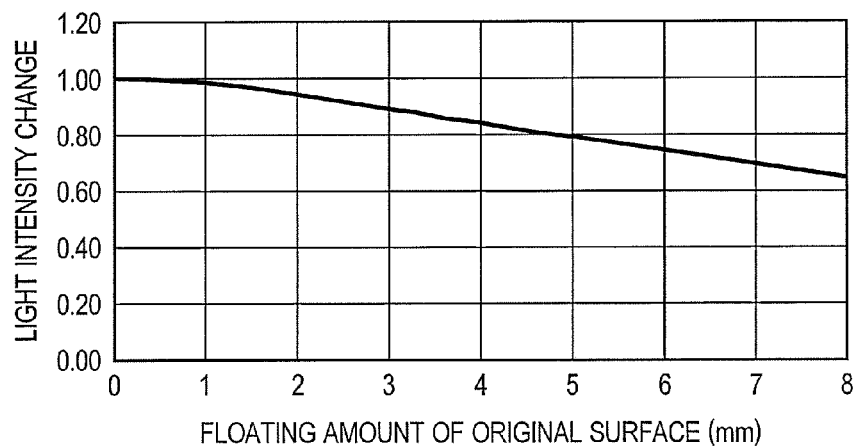
FIG. 4 is a graph showing changes in the light intensity with floating of the original in the illumination apparatus according to the first embodiment.
Figure 13:
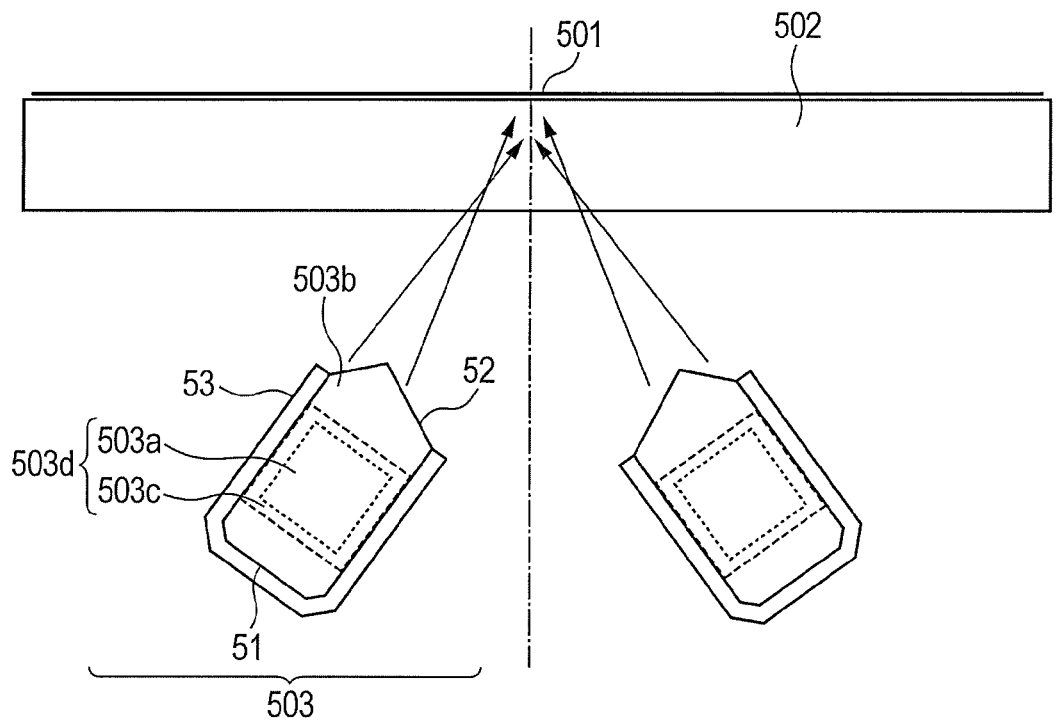
FIG. 13 is a cross sectional view on a sub-scanning section of a conventional illumination apparatus.

FIG. 13 shows a conventional light guide illumination apparatus used in CIS method. FIG. 3 shows comparison of the illuminance distribution along the sub-scanning direction on the original surface between the embodiment and the illumination apparatus using conventional light guides. FIG. 4 shows changes in the light intensity (illumination depth characteristics) with floating of the original surface in this embodiment.

In this embodiment, as is clear from FIG. 3, a stable illumination area along the sub-scanning direction (defined as a width at which the light intensity is 90% or more of the peak light intensity in the sub-scanning direction) is 4 mm in this embodiment in comparison to in the conventional example. With the configuration, even when the reading position is deviated in case the reduction optical system is adopted, a sufficient illumination area can be obtained to cover such case. Further, a high condensing efficiency with respect to the sub-scanning direction which is 1.2 times higher than that of the conventional illumination apparatus is achieved.

In this embodiment, as is clear from FIG. 4, even if there is a floating larger than 5 millimeters, the light intensity is higher than 75% of the light intensity on the original surface with no floating, resulting in a sufficiently large illumination depth.

Illuminance Distribution Along Main Scanning Direction

When the illuminance in the read area of the original is uniform along the main scanning direction, the intensity of light coming from the end position having an angle of incidence θ relative to the optical axis of the imaging lens 106 is detected as a light intensity reduced by cos 4θ as compared to light coming from the center position having an angle of incidence of θ. Therefore, in order for the detected light intensity to be uniform along the main scanning direction, it is necessary that the illuminance at the end positions with respect to the main scanning direction in the read area of the original be made higher than that at the center position.

Specifically, the case where the first optical surface 1 is a diffusive surface, the diffusive area of the first optical surface 1 is made larger (or the density of the diffusive part is made denser) in the both end portions with respect to the main scanning direction than that in the central portion. In the case where the first optical surface 1 is an incidence surface and light emitting elements arranged in an array along the main scanning direction are used, the pitch of the arrangement of the light emitting elements is made smaller in both end portions with respect to the main scanning direction than that in the central portion. In the case where the first optical surface 1 is an incidence surface and a surface light-emitting light source is used, the area of the light source is made larger in the end portions with respect to the main scanning direction than in the central portion.

In the case where the first optical surface 1 is an incidence surface and light emitting elements arranged in an array along the main scanning direction are used, the pitch of the arrangement is larger in the central portion with respect to the main scanning direction, expectedly leading to uneven illuminance. In this case, the light exit surface of the light guide is adapted to have a power (refractive power) along the main scanning direction. Specifically, toric surface areas having curvature along the main scanning direction are provided at a plurality of positions. Consequently, in the areas having curvature along the main scanning direction, light beams once converge and thereafter diverge to illuminate the original 101. This improves unevenness of the illuminance along the main scanning direction.

Second Embodiment

Figure 5:
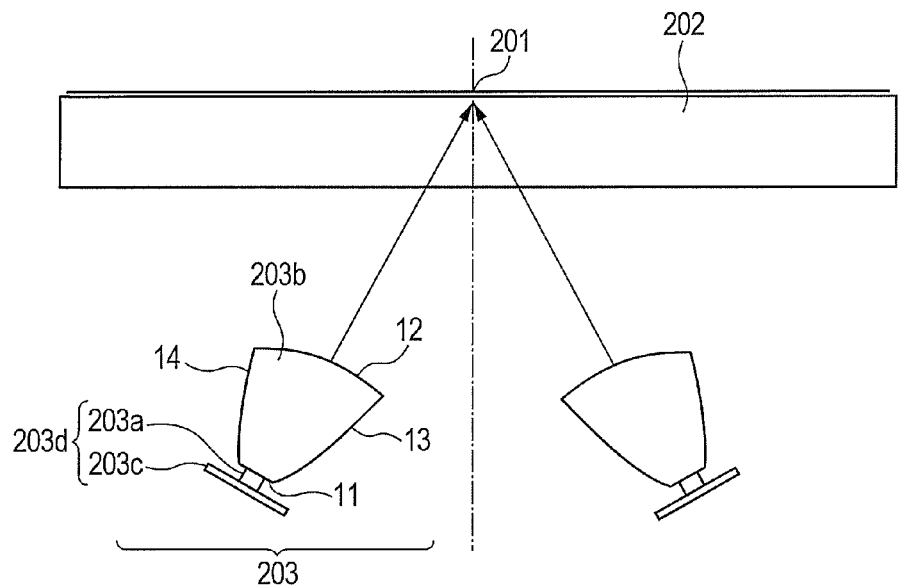
FIG. 5 is a cross sectional view on a sub-scanning section of an illumination apparatus according to a second embodiment of the present invention.

FIG. 5 is a cross sectional view on a sub-scanning section of the original illumination apparatus according to this embodiment. This apparatus differs from the apparatus according to the first embodiment in that the first optical surface 11 is an incidence surface, a light source unit 203d including a plurality of white LED light sources 203a arranged in a single array along the main scanning direction is used as the light source unit and arranged immediately below the first optical surface 11. The construction of the image reading apparatus is the same as the first embodiment and will not be described further. In the following, the illumination apparatus according to this embodiment will be described in detail.

Light Guide

Figure 6:
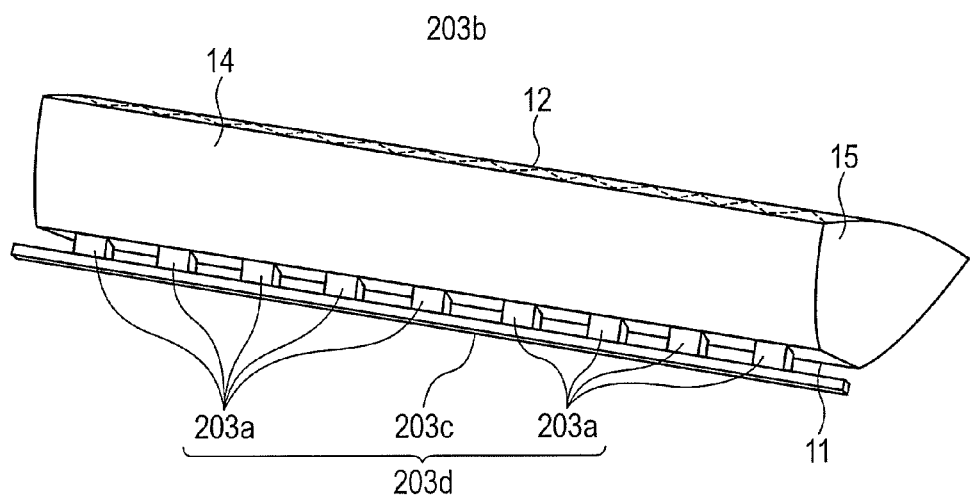
FIG. 6 is a perspective view of a light guide of the illumination apparatus according to the second embodiment.

FIG. 5 is a cross sectional view on sub-scanning section of a light guide 203b of the illumination apparatus 203 for image reading according to this embodiment. FIG. 6 is a perspective view of the light guide 203b. As with the light guide according to the first embodiment, the light guide 203b has a first optical surface 11, a light exit surface 12, a first reflective side surface 13, and a second reflective side surface 14, the first and second reflective side surfaces 13, 14 extending between the first optical surface 11 and the light exit surface 12. As shown in FIG. 6, the shape of the light guide 203b is uniform along the main scanning direction.

In this embodiment, the first optical surface 11 is an incidence surface. The light source unit 203d includes a plurality of white LED light sources 203a arranged in a single array along the main scanning direction and is arranged immediately below the first optical surface 11. In order to further enhance the condensing efficiency, the first and second reflective side surfaces 13, 14 are shaped to be parabolic surfaces, which makes the width of the first optical surface 11 smaller and have a paraxial power enhancing the condensing efficiency.

The shape of the light guide in this embodiment is specified as follows: the width D of the first optical surface 11 is 1.6 millimeters; the value of the ratio S1/S2 of the surface areas of the first and second reflective side surfaces 13, 14 is equal to 1.21; and the paraxial power $\phi$ of the first and second reflective side surfaces 13, 14 is 2.5. This shape satisfies conditions (1) and (2). The light exit surface 12 is inclined relative to the first optical surface 11 by 10 degrees, and the curvature radius r of the light exit surface 12 is 8.0 millimeters.

Illumination Light Intensity in End Portions Relative to that in Central Portion In this embodiment, since the first optical surface 11 is the incidence surface, the pitch of arrangement of the white LEDs 203a arranged in an array along the main scanning direction is varied. As with in the first embodiment, the pitch of arrangement is adapted to be smaller in both end portions with respect to the main scanning direction than that in the central portion in order to make the light intensity in the end portions larger, on assumption that the illumination apparatus is used with a reduction optical system.

Uniform Illumination Light Intensity in Central Portion with Respect to Main Scanning Direction In this embodiment, as shown in FIG. 6, in order to improve angle characteristics on the original surface or to reduce unevenness of the illuminance with respect to the main scanning direction, the light exit surface 12 is adapted to have a power in the main scanning direction. Specifically, toric surface areas having curvature along the main scanning direction are provided at a plurality of positions. Consequently, in the areas having curvature along the main scanning direction, light beams once converge and thereafter diverge to illuminate the original 201. This improves unevenness of the illuminance along the main scanning direction.

Figure 7:
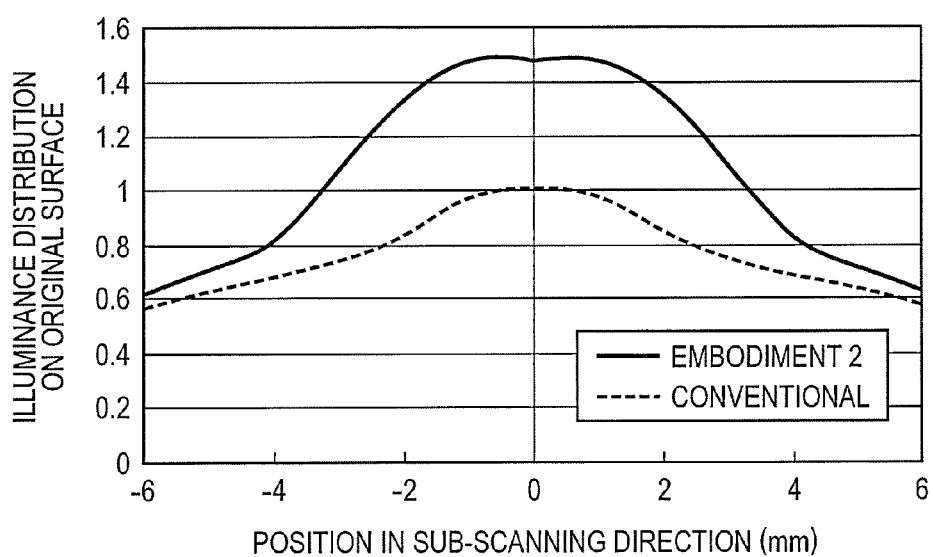
FIG. 7 is a graph showing comparison of the light intensity on the original surface between the illumination apparatus according to the second embodiment and a conventional illumination apparatus.
Figure 8:
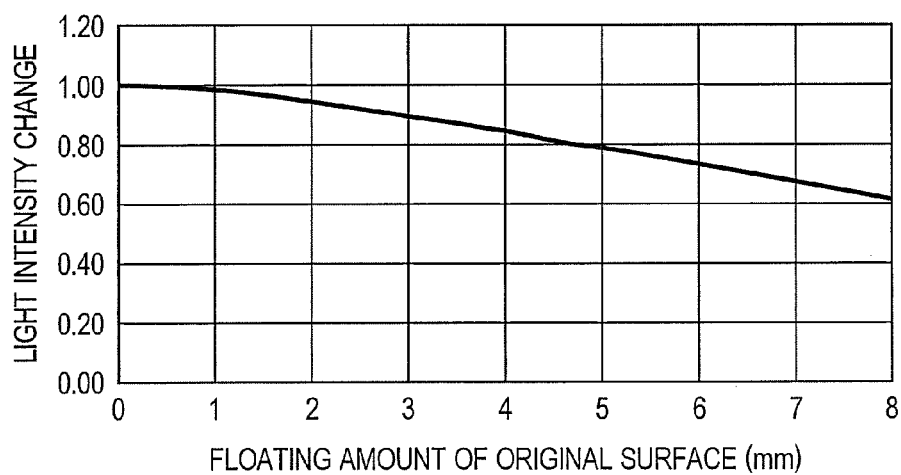
FIG. 8 is a graph showing change in the light intensity with floating of the original in the illumination apparatus according to the second embodiment.

Illuminance Distribution Along Sub-Scanning Direction And Illumination Depth FIG. 7 shows comparison of the illuminance distribution along the sub-scanning direction on the original surface between the embodiment and the conventional illumination apparatus. FIG. 8 shows changes in the light intensity (illumination depth characteristics) with floating of the original surface in this embodiment. In this embodiment, as is clear from FIG. 7, a stable illumination area along the subscanning direction (defined as a width at which the light intensity is 90% or more of the peak light intensity in the sub-scanning direction) is 3.8 mm in this embodiment. With the configuration, even when the reading position is deviated in case the reduction optical system is adopted, a sufficient illumination area can be obtained to cover such case. Further, a high condensing efficiency with respect to the sub-scanning direction which is 1.5 times higher than that of the conventional illumination apparatus is achieved. In this embodiment, as is clear from FIG. 8, even if there is a floating larger than 5 millimeters, the light intensity is higher than 75% of the light intensity on the original surface with no floating, resulting in a sufficiently large illumination depth.

Third Embodiment

Figure 9:
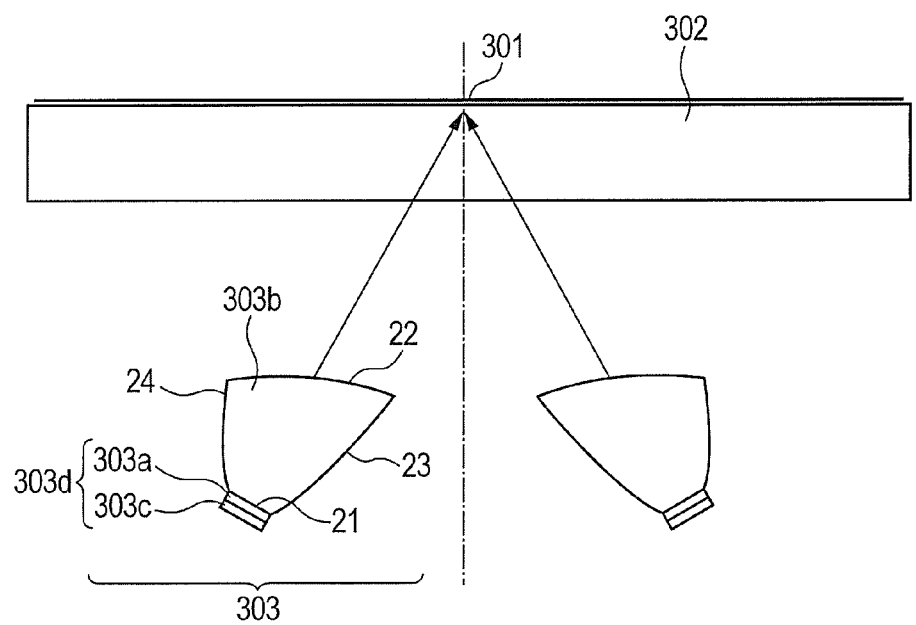
FIG. 9 is a cross sectional view on a sub-scanning section of an illumination apparatus according to a third embodiment of the present invention.
Figure 10:
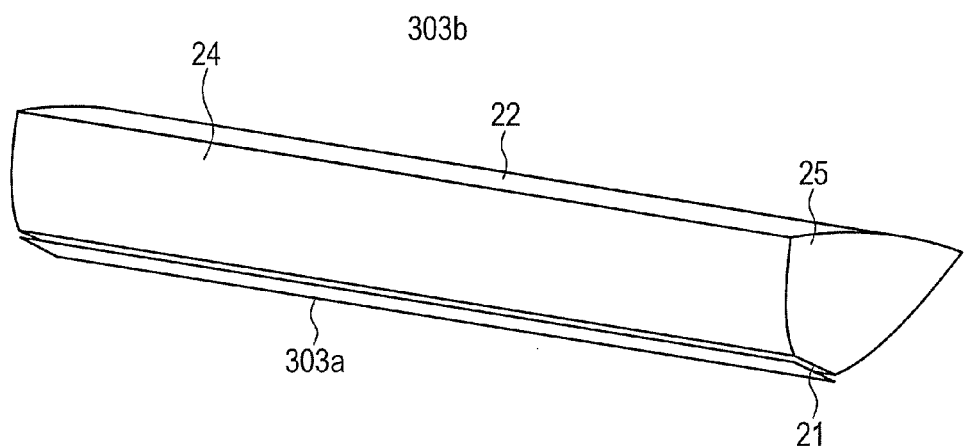
FIG. 10 is a perspective view of a light guide of the illumination apparatus according to the third embodiment.

FIG. 9 is a cross sectional view on a sub-scanning section of a light guide 303b of an illumination apparatus 303 according to a third embodiment. FIG. 10 is a perspective view of the light guide 303b. The light guide according to this embodiment differs from those according to the first and second embodiments that the first optical surface 21 is an incident surface, and the light emitting element 303a of the light source unit 303d is a surface light-emitting device (high illuminance EL light source) which is arranged immediately below the first optical surface 21. The construction of the image reading apparatus is the same as the first and second embodiments and will not be described further.

Light Guide

As with the light guides according to the first and second embodiments, the light guide 303b according to this embodiment has a first optical surface 21, a light exit surface 22, a first reflective side surface 23, and a second reflective side surface 24, the first and second reflective side surfaces 23, 24 extending between the first optical surface 21 and the light exit surface 22. As shown in FIG. 10, the shape of the light guide 303b is uniform along the main scanning direction. To achieve a condensing efficiency as high as that in the second embodiment, the first and second reflective side surfaces 23, 24 are shaped to be ellipsoidal reflective surfaces, which allows a variation in power finer than parabolic surfaces. In this embodiment, the use of a surface light emitting device can eliminate a complex surface shape design in the light exit surface 22.

The shape of the light guide in this embodiment is specified as follows: the width D of the first optical surface 21 is 2.0 millimeters; the value of the ratio S1/S2 of the surface areas of the first and second reflective side surfaces 23, 24 is equal to 1.50; and the paraxial power $\phi$ of the first and second reflective side surfaces 23, 24 is 2.0. This shape satisfies conditions (1) and (2). The light exit surface 22 is inclined relative to the first optical surface 21 by 20 degrees, and the curvature radius r of the light exit surface 22 is 12.5 millimeters.

Illuminance Distribution Along Main Scanning Direction

In this embodiment, since the first optical surface is an incidence surface, the area of the surface light-emitting light source used as the light emitting element 203a is varied along the main scanning direction. Specifically, as with in the first and second embodiments, the light-emitting area is varied in such a way that the width of the surface light-emitting device is made smaller in its central portion with respect to the main scanning direction and larger in its end portions with respect to the main scanning direction in order to make the light intensity in the end portions larger, on assumption that the illumination apparatus is used with a reduction optical system.

Illuminance Distribution Along Sub-Scanning Direction and Illumination Depth

Figure 11:
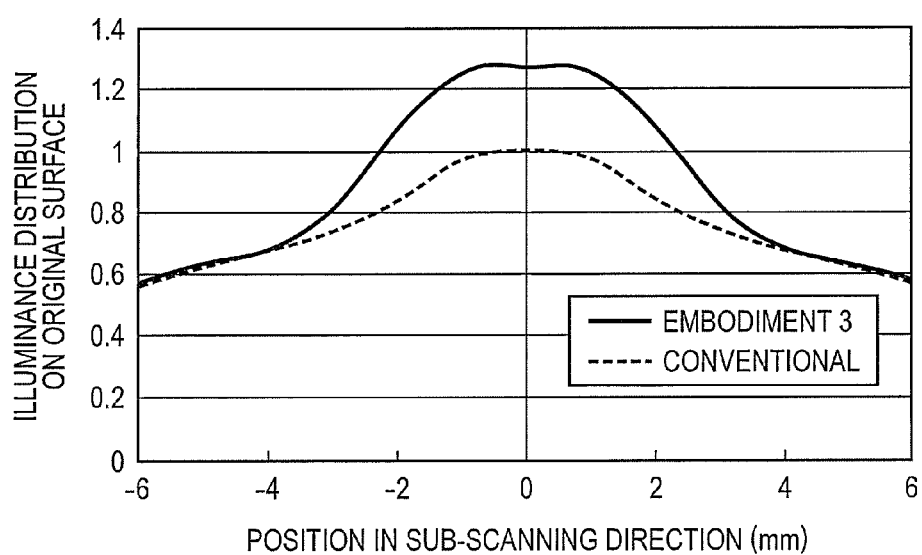
FIG. 11 is a graph showing comparison of the light intensity on the original surface between the illumination apparatus according to the third embodiment and a conventional illumination apparatus.
Figure 12:
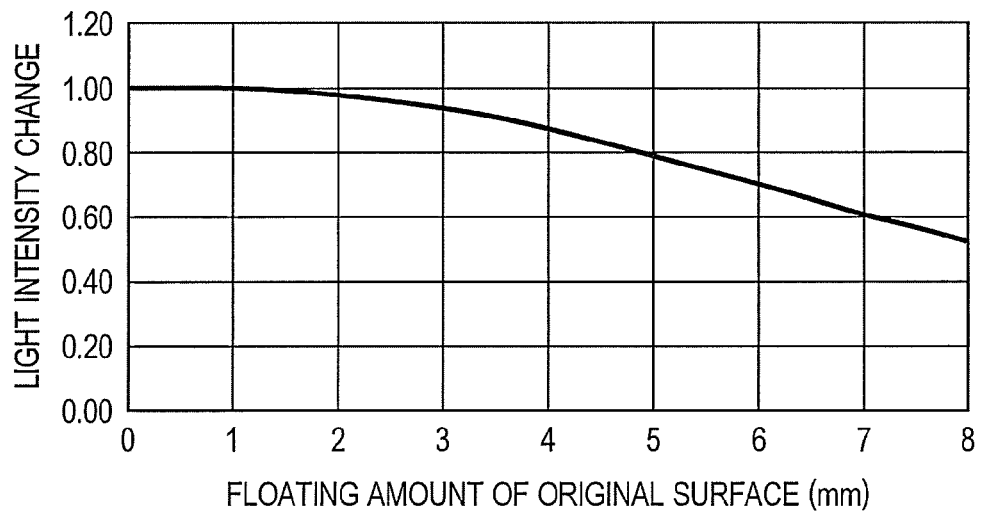
FIG. 12 is a graph showing changes in the light intensity with floating of the original in the illumination apparatus according to the third embodiment.

FIG. 11 shows comparison of the illuminance distribution along the sub-scanning direction on the original surface between the embodiment and the conventional apparatus. FIG. 12 shows changes in the light intensity (illumination depth characteristics) with floating of the original surface in this embodiment. In this embodiment, as is clear from FIG. 11, a stable illumination area along the sub-scanning direction (defined as a width at which the light intensity is 90% or more of the peak light intensity in the sub-scanning direction) is 3.8 mm in this embodiment in comparison to 2.8 mm in the conventional example. With the configuration, even when the reading position is deviated in case the reduction optical system is adopted, a sufficient illumination area can be obtained to cover such case. Further, a high condensing efficiency with respect to the sub-scanning direction which is 1.3 times higher than that of the conventional illumination apparatus is achieved. In this embodiment, as is clear from FIG. 12, even if there is a floating larger than 5 millimeters, the light intensity is higher than 75% of the light intensity on the original surface with no floating, resulting in a sufficiently large illumination depth.

Although preferred embodiments of the present invention have been described, it is to be understood that the present invention is not limited to the embodiments. Various modifications and changes can be made to them without departing from the essential scope of the present invention.

This application claims the benefit of Japanese Patent Application Nos. 2012-255273, filed Nov. 21, 2012, and 2013-22394, filed Nov. 8, 2013, which are hereby incorporated by reference herein in their entirety.

What is claimed is:

1. An illumination apparatus for use in an image reading apparatus that forms a reduction image of a read area of an original on an image pickup element by an imaging optical system, the illumination apparatus comprising:
   a light source illuminating the original; and
   a light guide guiding light from the light source to the original;
   wherein the light guide has a first optical surface on which light from the light source is incident or that diffuses light from the light source, a second optical surface from which light exits toward the read area, a third optical surface, and a fourth optical surface, the third optical surface and the fourth optical surface being arranged between the first optical surface and the second optical surface in a sub-scanning section perpendicular to a longitudinal direction of the light guide, the third optical surface being arranged on a side closer to a reading optical axis of the imaging optical system, and the fourth optical surface being arranged on a side farther from the reading optical axis of the imaging optical system,
   wherein the third optical surface and the fourth optical surface are reflective surfaces having paraxial powers equal to each other,
   wherein the following condition is satisfied:

$1.5 \leq \phi \leq 2.8$, where $\phi$ in $mm^{-1}$ is the paraxial power of the third optical surface and the fourth optical surface.

2. An illumination apparatus according to claim 1, wherein the third optical surface extends longer than the fourth optical surface in a direction toward the read area in the sub-scanning section.

3. An illumination apparatus according to claim 1, wherein the third optical surface and the fourth optical surface are parabolic reflective surfaces or ellipsoidal reflective surfaces having a positive power and having a focal point located at the center of the first optical surface in the sub-scanning section.

4. An illumination apparatus according to claim 1, wherein the second optical surface has a curved surface shape having a positive power in the sub-scanning section.

5. An illumination apparatus according to claim 1, wherein the light guide is arranged on each of both sides of the reading optical axis.

6. An illumination apparatus according to claim 1, wherein the first optical surface has normal line directed to the read area.

7. An illumination apparatus according to claim 1, wherein:
   the first optical surface is a diffusive surface that diffuses light incident thereon from the light source;
   the light source is arranged at an end of the light guide; and
   the end of the light guide serves as an incidence surface.

8. An illumination apparatus according to claim 1, wherein:
   the first optical surface is an incidence surface on which light from the light source is incident; and
   the light source is arranged to be opposed to the first optical surface.

9. An illumination apparatus according to claim 1, wherein the following condition is satisfied:

$1.1 < S1/S2 < 1.6$, where S1 is the surface area of the third optical surface, and S2 is the surface area of the fourth optical surface.

10. An illumination apparatus according to claim 7, wherein the density of a diffusive part constituting the diffusive surface varies along the longitudinal direction.

11. An illumination apparatus according to claim 8, wherein the light source comprises either a plurality of light emitting elements arranged in an array along the longitudinal direction or a surface light-emitting device extending along the longitudinal direction and having a light emission area that varies along the longitudinal direction.

12. An illumination apparatus according to claim 11, wherein the light source comprises a plurality of light emitting elements arranged in an array along the longitudinal direction, and the second optical surface has a plurality of toric surface areas having curvature along the longitudinal direction.

13. An illumination apparatus according to claim 1, wherein the shape of the light guide is uniform along the longitudinal direction.

14. An image reading apparatus comprising:

an illumination apparatus that illuminates an original; and an image forming optical system that forms a reduction image of a reading area of the original on an image pickup element, wherein the illumination apparatus includes a light source and a light guide that guides light from the light source to the original, wherein the light guide has a first optical surface on which light from the light source is incident or that diffuses light from the light source, a second optical surface from which light exits toward the read area, a third optical surface, and a fourth optical surface, the third optical surface and the fourth optical surface being arranged between the first optical surface and the second optical surface in a sub-scanning section perpendicular to a longitudinal direction of the light guide, the third optical surface being arranged on a side closer to a reading optical axis of the imaging optical system, and the fourth optical surface being arranged on a side farther from the reading optical axis of the imaging optical system, wherein the third optical surface and the fourth optical surface are reflective surfaces baying paraxial powers equal to each other, wherein the following condition is satisfied:

$1.5 \leq \phi \leq 2.8,$ where $\phi$ in $mm^{-1}$ is the paraxial power of the third optical surface and the fourth optical surface.

15. An image reading apparatus according to claim 14, wherein the third optical surface extends longer than the fourth optical surface in a direction toward the read area in the sub-scanning section.

16. An image reading apparatus according to claim 14, wherein the third optical surface and the fourth optical surface are parabolic reflective surfaces or ellipsoidal reflective surfaces having a positive power and having a focal point located at the center of the first optical surface in the sub-scanning section.

17. An image reading apparatus according to claim 14, wherein the second optical surface has a curved surface shape having a positive power in the sub-scanning section.

18. An image reading apparatus according to claim 14, wherein the following condition is satisfied:

$1.1 < S1/S2 < 1.6,$ where S1 is the surface area of the third optical surface, and S2 is the surface area of the fourth optical surface.

19. An image reading apparatus according to claim 14, wherein the illumination apparatus is arranged on each of both sides of the reading optical axis symmetrically with respect to the reading optical axis.

* * * * *